United States Patent
Ciot (10) Patent No.: US 7,581,075 B1
(45) Date of Patent: Aug. 25, 2009

(54) MEMORY PRESSURE METRIC FOR APPLICATION SCALABILITY

(75) Inventor: Thierry Gaëtan Ciot, Hollis, NH (US)

(73) Assignee: Micro Focus (IP) Limited, Newbury, Berkshire (GB)

( * ) Notice: Subject to any disclaimer, the term of this patent is extended or adjusted under 35 U.S.C. 154(b) by 352 days.

(21) Appl. No.: 11/503,870

(22) Filed: Aug. 11, 2006

Related U.S. Application Data (63) Continuation-in-part of application No. 11/119,427, filed on Apr. 29, 2005.

(51) Int. Cl.
*G06F 12/00* (2006.01)

(52) U.S. Cl. .................................... 711/170
(58) Field of Classification Search ........................ None
See application file for complete search history.

(56) References Cited

U.S. PATENT DOCUMENTS

| 7,178,143 | B2 * | 2/2007 | Pugh et al. | 717/170 |
| 2004/0230763 | A1 * | 11/2004 | Cohen et al. | 711/170 |

* cited by examiner

*Primary Examiner*—Hiep T Nguyen
(74) *Attorney, Agent, or Firm*—Muirhead and Saturnelli, LLC (57) ABSTRACT

Computation of a metric, termed "memory pressure," provides an indication of software application scalability, in terms of memory, when making changes to multi-user applications. The memory pressure metric may be measured on a single user application run and does not require running the application under load tests. Since the metric can be measured on single user application runs, software testing and assessment takes considerably less time, resulting in developer productivity increase.

26 Claims, 11 Drawing Sheets

MEMORY PRESSURE METRIC FOR APPLICATION SCALABILITY

CROSS-REFERENCE TO RELATED APPLICATIONS

This application is a continuation-in-part of U.S. patent application Ser. No. 11/119,427 filed on Apr. 29, 2005, now pending, which is incorporated herein by reference.

TECHNICAL FIELD

This application relates to the field of computer software and, more particularly to software analysis and diagnostics related to memory consumption and usage.

BACKGROUND

Computer software programs create, use, and discard software objects at run time and, in some cases, according to run time conditions. When objects are created, memory is allocated for use, and when objects are discarded, the corresponding memory may be deallocated. Memory allocation plays an important role in software application efficiency and scalability.

For software engineers, including developers, programmers, testers and managers, it may be difficult to assess the impact of an application change on memory scalability, in particular for multi-user applications such as web applications. It may also be difficult to compare two or more possible changes to the software code to decide which one is a better change in terms of memory scalability. Further, it may also be difficult to assess memory scalability of a new build. Moreover, it may also be difficult to monitor, at a high level, the trend of the applications for which a software quality assurance manager may be responsible.

One known option to address the above-noted issues is for the software engineer to run experimental load tests of one or more applications, including scenarios of changes made to the applications, and compare or aggregate various measurements. However, running a load test has several disadvantages: it takes a lot of time; it is not easy to do; it uses expensive tools; and it sometimes requires multiple computers, adding to the cost and complexity of running load tests.

Accordingly, it may be desirable to provide for a system to assess the memory impact of one or more application changes without having to run experimental load tests. It may also be desirable to provide for a system to test and verify, in an automated fashion, how a new build is performing and compare it to previous builds on single user application runs. Further, it may also be desirable to provide for a system that can be monitored over time to obtain high level visibility into application memory scalability changes.

SUMMARY

Computation of a metric, termed "memory pressure," provides an indication of application scalability, in terms of memory, when making changes to multi-user applications. The memory pressure metric may be measured on a single user application run and does not require running the application under load tests. Since the metric can be measured on single user application runs, software testing and assessment takes considerably less time, resulting in developer productivity increase.

According to the present system, a method of measuring memory allocation information includes determining when a resource is allocated, determining a size of the resource, and determining a time measurement based on allocation of the resource. Measuring memory allocation information may also include determining an elapsed time since a previous resource was allocated, determining a total of all memory allocated by adding the size of said resource to sizes of resources previously allocated, determining a current memory pressure by multiplying the elapsed time by the total of all memory allocated, and determining the metric for memory allocation by summing the current memory pressure with a value calculated for the metric in connection with a previous iteration. The metric may be determined by integrating a memory allocation function over time, and may include adding to the metric when memory is allocated and subtracting from the metric when memory is deallocated. The resource may be a software object. The metric may be calculated based on information determined for a first resource and at least one second resource. The time measurement may correspond to at least one of: a number of method calls since the beginning of program execution, and actual time. The metric or a comparison of a first metric and second metric may be displayed, wherein the first metric may be determined for at least one of: (i) a first software program and a second software program and (ii) a software program operating under a first condition and a second condition.

According further to the present system, computer software, stored in a computer-readable medium, that measures memory allocation information includes machine executable code that determines when a resource is allocated, machine executable code that determines a size of the resource, and machine executable code that determines a time measurement based on allocation of the resource. The software further includes machine executable code that calculates a metric based on said size of the resource and said time measurement. The computer software may include machine executable code that determines an elapsed time since a previous resource was allocated, machine executable code that determines a total of all memory allocated by adding the size of said resource to sizes of resources previously allocated, machine executable code that determines a current memory pressure by multiplying the elapsed time by the total of all memory allocated, and machine executable code that determines the metric for memory allocation by summing the current memory pressure with a value calculated for the metric in connection with a previous iteration. The metric may be determined by integrating a memory allocation function over time, and may include adding to the metric when memory is allocated and subtracting from the metric when memory is deallocated. The resource may be a software object. The metric may be calculated based on information determined for a first resource and at least one second resource. The time measurement may correspond to at least one of: a number of method calls since the beginning of program execution, and actual time. The metric or a comparison of a first metric and second metric may be displayed, wherein the first metric may be determined for at least one of: (i) a first software program and a second software program and (ii) a software program operating under a first condition and a second condition.

According further to the present system, a system for assessing memory allocation information includes a processor that contains machine executable code that that determines when a resource is allocated, machine executable code that determines a size of said resource, machine executable code that determines a time measurement based on allocation of said resource; and machine executable code that calculates a metric based on said size of said resource and said time measurement. The system further includes an interface that displays information about said metric. The processor may further include machine executable code that determines an elapsed time since a previous resource was allocated, machine executable code that determines a total of all memory allocated by adding the size of the resource to sizes of resources previously allocated, machine executable code that determines a current memory pressure by multiplying the elapsed time by the total of all memory allocated, and machine executable code that determines the metric for memory allocation by summing the current memory pressure with a value calculated for the metric in connection with a previous iteration. The metric may be determined by integrating a memory allocation function over time, and may include adding to the metric when memory is allocated and subtracting from the metric when memory is deallocated. The resource may be a software object. The time measurement may correspond to at least one of: a number of method calls since the beginning of program execution, and actual time. The metric or a comparison of a first metric and second metric may be displayed with the interface, wherein the first metric may be determined for at least one of: (i) a first software program and a second software program and (ii) a software program operating under a first condition and a second condition.

BRIEF DESCRIPTION OF THE DRAWINGS

The system is described with reference to the several figures of the drawings, in which.

DETAILED DESCRIPTION OF VARIOUS EMBODIMENTS

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Figure 1:
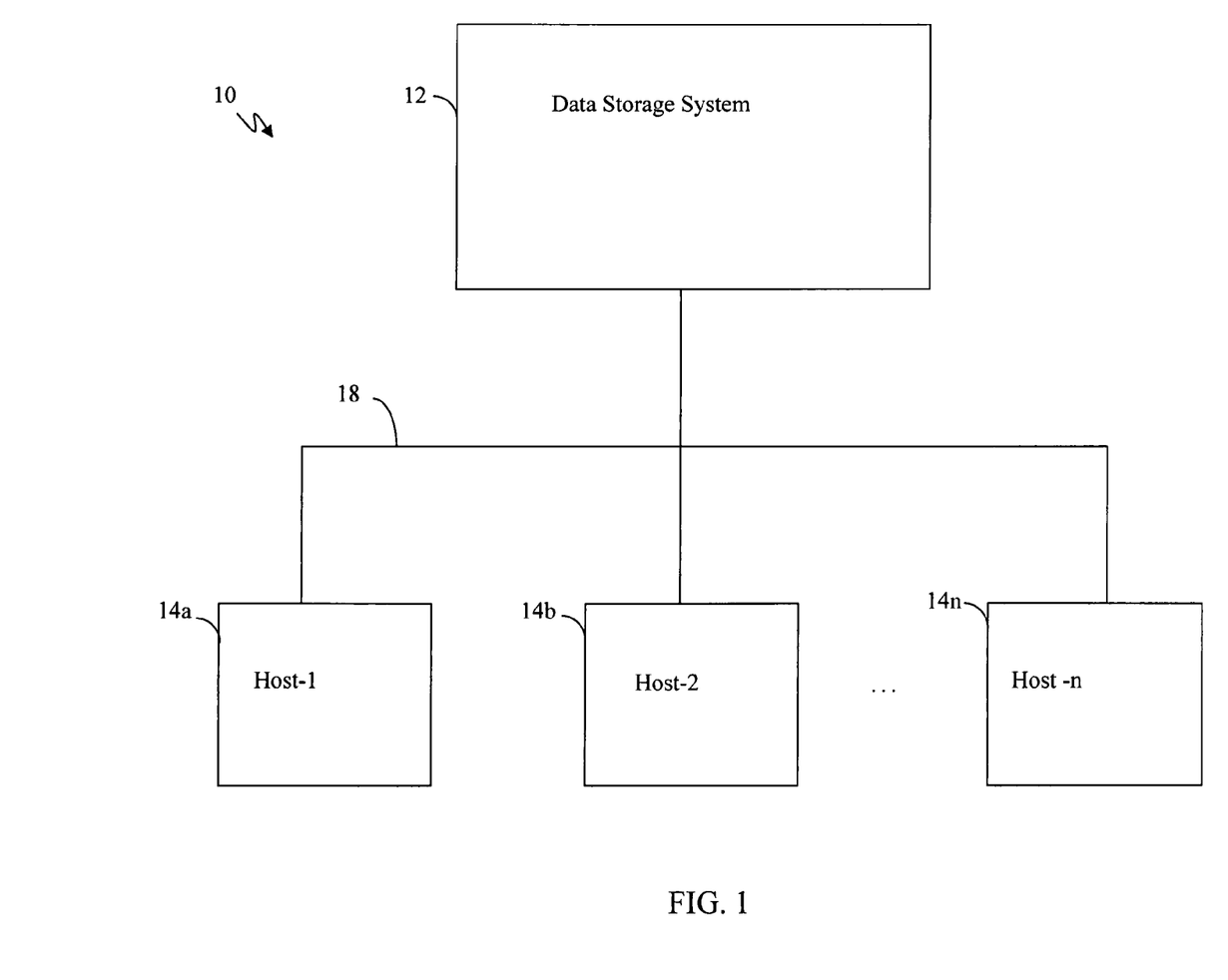
FIG. 1 illustrates a computer system that may be used in performing techniques according to an embodiment of the system described herein.

FIG. 1 illustrates a computer system 10 including a data storage system 12 connected to a plurality of host systems 14a-14n through a communication medium 18. In the embodiment shown, the N hosts 14a-14n may access the data storage system 12, for example, in connection with performing input/output (I/O) operations or data requests. The communication medium 18 may be any one of a variety of networks or other type of communication connections as known to those skilled in the art. The communication medium 18 may be a network connection, bus, and/or other type of data link, such as a hardwire, wireless, or other connection known in the art. For example, the communication medium 18 may be the Internet, an intranet, network or other connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. Each of the processors included in the host computer systems 14a-14n may be any one of a variety of commercially available single or multi-processor system, such as an Intel-based processor, IBM or other mainframe, a PC or other workstation, or any other type of commercially available processor able to support processing as described herein.

It should be noted that the particulars of the hardware and software included in each of the host systems 14a-14n, as well as those components that may be included in the data storage system 12, are described herein in more detail, and may vary with each particular embodiment. Each of the host computers 14a-14n may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or GIGE (Gigabit Ethernet), and the like. Some or all of the connections by which the hosts and data storage system 12 may be connected to the communication medium 18 may pass through other communication devices, such as switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform data operations.

Figure 2:
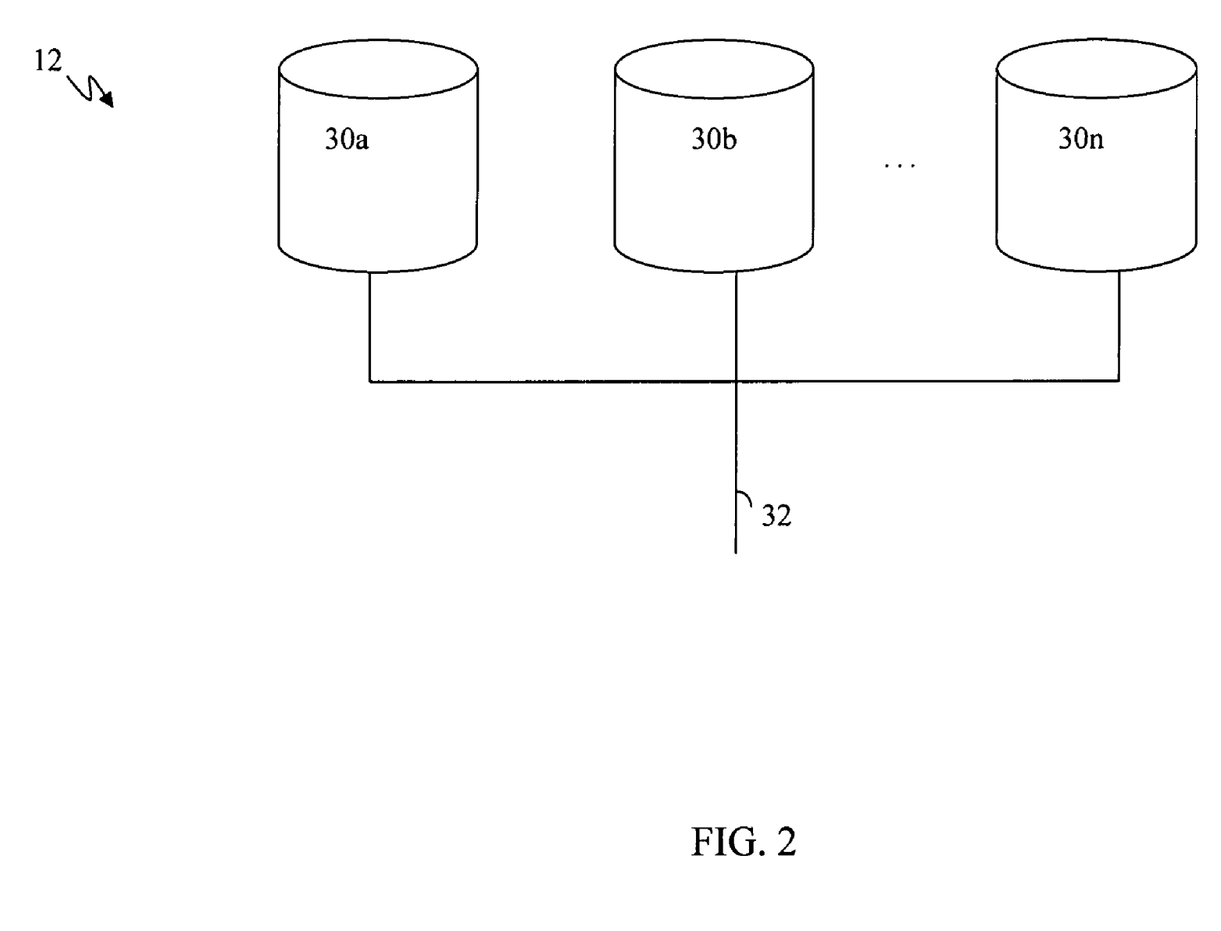
FIG. 2 illustrates a data storage system of the computer system of FIG. 1 according to an embodiment of the system described herein

Referring to FIG. 2, a data storage system 12 may be included in the computer system 10 of FIG. 1. The data storage system 12 in the example shown may include a plurality of data storage devices 30a-30n. The data storage devices 30a-30n may communicate with components external to the data storage system 12 using a communication medium 32. Each of the data storage devices may be accessible to the hosts 14a-14n using an interface connection between the communication medium 18 (described above) and the communication medium 32. It should be noted that the communication medium 32 may be any one of a variety of different types of connections and interfaces used to facilitate communication between communication medium 18 and each of the data storage devices 30a-30n.

The data storage system 12 may include any number and type of data storage devices. For example, the data storage system may include a single device, such as a disk drive, as well as a plurality of devices in a more complex configuration, such as with a storage area network and the like. Data may be stored, for example, on magnetic, optical, or silicon-based media. The particular arrangement and configuration of a data storage system may vary in accordance with the parameters and requirements associated with each embodiment.

Each of the data storage devices 30a-30n may be characterized as a resource included in an embodiment of the computer system 10 to provide storage services for the host computer systems 14a-14n. The devices 30a-30n may be accessed using any one of a variety of different techniques. In one embodiment, the host systems may access the data storage devices 30a-30n using logical device names or logical volumes. The logical volumes may or may not correspond to the actual data storage devices. For example, one or more logical volumes may reside on a single physical data storage device such as 30a. Data in a single data storage device may be accessed by one or more hosts allowing the hosts to share data residing therein.

Figure 3:
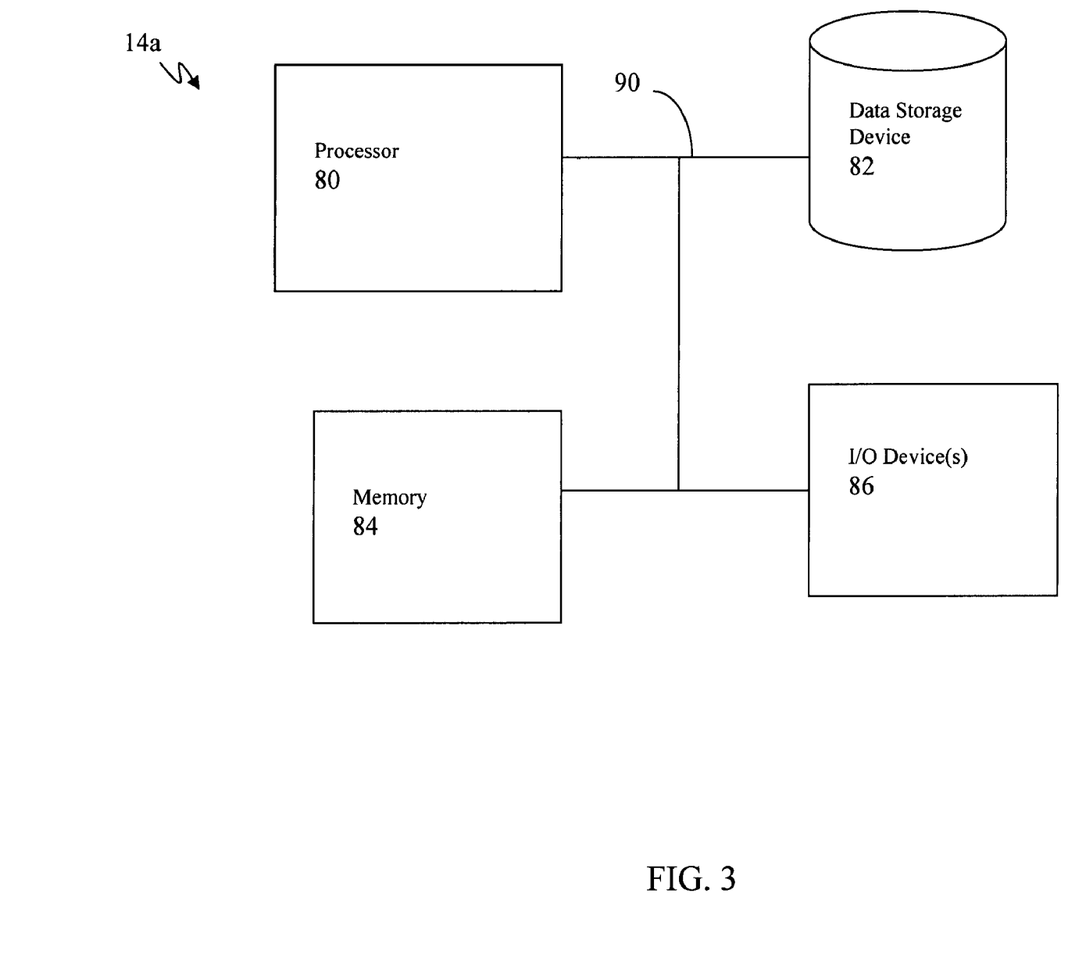
FIG. 3 illustrates components that may be included in a host system of the computer system of FIG. 1 according to an embodiment of the system described herein.

Referring to FIG. 3, shown is an example of a possible host or user system 14a. It should be noted that although a particular configuration of a host system is described herein, other host systems 14b-14n may also be similarly or differently configured. Additionally, it should be noted that each host system 14a-14n may have any one of a variety of different configurations including different hardware and/or software components. The host system 14a includes a processor 80, a memory 84, one or more I/O devices 86 and one or more data storage devices 82 that may be accessed locally within the host system 14a. Each of the foregoing may communicate using a bus or other communication medium 90. Each of the foregoing components may be any one of more of a variety of different types in accordance with the particular host system 14a.

Computer instructions may be executed by the processor 80 to perform a variety of different operations. As known in the art, executable code may be produced, for example, using a loader, a linker, a language processor, and other tools that may vary in accordance with each embodiment. Computer instructions and data may also be stored on a data storage device 82, ROM, or other form of media or storage. The instructions may be loaded into memory 84 and executed by processor 80 to perform a particular task. The instructions may be executed directly by the processor 80 (e.g., in the case of code that is compiled and linked) or the instructions may be interpreted by an interpreter that executes directly on the processor 80.

A computer program may contain instructions that perform tasks such as, for example, creation, use, and disposal of objects. As known to those skilled in the art, a program may perform operations in connection with objects. The program may be written using any one or more programming languages such as, for example, Java, C++, C#, VB.Net, and the like. Programs, such as those which are object oriented programs, may be characterized as utilizing a collection of objects which interact with one another. When objects are created, memory is consumed. When objects are no longer in use by a program, it may be desirable to destroy, dispose, or otherwise have the memory associated with an object available for reuse. When the lifetime of an object within a program is longer than actually needed or if an object is allocated too early or not used, performance and scalability issues may result.

The system described herein provides for the computation of a metric termed memory pressure that provides an indication of application scalability, in terms of memory, when making changes to multi-user applications. The memory pressure metric may be measured on a single user application run and does not require running the application under load tests. Since the metric can be measured on single user application runs, software testing and assessment may take considerably less time, resulting in developer productivity increase. The system described herein enables a new working mode, in that, because the turnaround time for software assessment is greatly reduced, software programmers are more likely to experiment with various solutions.

An object may no longer be needed when there are no further references to that particular object from other objects in the system, and no references in any local variables on the method call stack. Garbage collection techniques are known to those of ordinary skill in the art and may be characterized, for example, as techniques used in connection with freeing memory or allocated objects (i.e., deallocating the objects) that are no longer referenced and/or that have been marked for disposal. For example, a Java run time system may perform garbage collection for objects that are no longer referenced by any run time code or variables. Other programming languages may use explicit memory management and garbage collection techniques, for example, where the programmer (i.e., the executing program) may be responsible for disposing of unused memory blocks by setting a flag for the object or calling a routine that compiles a list or otherwise keeps track of objects that are to be garbage collected.

Insight into object memory usage may be determined by measuring various times associated with an object. Times that may be measured in connection with the object may include the time at which an object is created (T1), the time at which an object is first used (T2), the time at which an object is last used (T3), and the time at which the object is garbage collected (T4). When measuring the quantity T1, a line of code associated with an object's allocation may also be noted and similarly at T4 for an object's deallocation. Similarly, when measuring the quantity T3, a line of code at which an object is used may also be noted. It is possible to associate the line of code associated with a last use to a particular object to alert a user at a point in a program after which the object is no longer in use by the program. It is after the last object use, such as the last line of code associated with the final T3 measurement, which indicates a point in the code where an object may be subject to garbage collection. In other words, after a last use of an object in the code, it may be advantageous to subject the object to garbage collection for reuse.

In connection with the foregoing four time measurements T1 through T4, an embodiment may also compute the following metrics:

Object useful existence duration, D1=T3−T2

Delayed object use duration, D2=T2−T1

Object retention duration, D3=T4−T3

Object not used duration, D4=D3+D2
Total allocation duration, D5=T4−T1

$$\frac{D1}{D2}$$

Memory ratio 1, $$\frac{D1}{D4}$$

Memory ratio 2,

It should be noted that the foregoing metrics, or any one or more thereof, may be used in connection with measurements for object tracking and usage within a program. In the foregoing, metric D1 represents an amount of time associated with what may be characterized as a lifetime of an object with regard to its usage in a program. To capture this aspect, D1 is expressed as a difference between an object's last and first usage within a program or other defined time period. The delayed object use duration metric D2, represents the delay or the amount of time between when an object is created and when it is first used. The object retention duration, D3, represents an amount of time from when an object is last used to when it is discarded or otherwise made available for reuse. The metric object not used duration, D4, may be characterized as an aggregate time of when an object is not used within a program. D4 may be represented as the sum of the time which elapses from when an object is first created to when the object is first used, and adding to that the amount of time from an object's last use to when the object is discarded. D5 may be characterized as the total amount of time that memory is allocated for an object. The memory ratios 1 and 2 may be characterized as providing measurements in connection with how long an object remains in comparison to a useful lifetime of an object. It is possible that the measurement T2 does not exist indicating that the object has been created but never used.

In one embodiment, the system described herein may operate as follows. Instances of object allocations and de-allocations are detected and, on object allocation, the size of the object is measured. A metric of memory consumption over time is computed. The memory pressure metric may be computed as ∫mem(t)dt, the Riemann integral of function mem(t) over a specific interval, where mem(t) represents the memory consumption of the program under test at a time t. In other words, y=mem(t) represents the memory consumption over time of the program under test. The interval may be tailored by the user. The metric and/or variations of the metric computed as outlined above may then be reported to the user.

It should be noted that time may be measured as elapsed time in actual seconds (or fraction thereof). Alternatively, time may be measured as the number of method calls in the overall system, where one method call is one time unit. Advantages of a time unit based on method calls, include: (i) the program under test is isolated from everything else happening on the system and in particular from the overhead of making the measurements in the first place, and (ii) a metric is provided that is comparable between runs.

In another embodiment, it should be noted that the system described herein for determining the memory pressure metric may run faster if the memory pressure metric is determined without collecting and processing all of the above-noted data concerning T1-T4.

In the system described herein, events of interest are object allocation, object deallocation and method calls on objects. With this information, one may compute the current amount of dynamic memory allocated at a specific time and may compute time as a number of method calls (the x-axis) using the function for memory allocation over time (y=mem(x), where x is time as number of method calls and y is the current amount of memory allocated). The memory pressure metric is computed as the integral between two points of mem(x). The integral corresponds to the total area under the curve represented by the function y=mem(x) between two points, which may be computed by summing the area of successive rectangles.

It should be noted that the number of classes, objects, thresholds, intervals, and the like, may be set using any one or more different techniques that may vary in accordance with different embodiments. For example, one or more parameters may be fixed within a system. Optionally, a system may also provide a mechanism, such as a configuration file or other command line option, by which a user may set one or more of option. Similarly, the particular unit of time or measurement may also be set using these and other techniques familiar to one of ordinary skill in the art.

The measurements associated with the memory pressure metric analysis may be taken at various points in time to measure changes in memory allocation. For example, metrics may be taken at a first point in time. Subsequently, a code change or correction may be made in order to improve the memory management and efficiency associated with software object use. After making one or more corrections or changes to existing code, the program may again be executed and the metrics may be collected at a subsequent point in time. The second set of metrics may reflect those metrics calculated after the corrections or changes have been made to the code. A delta or difference between the two sets of metrics may be used as a way to quantify or measure a change in memory allocation and/or memory usage of objects.

Note that the particular information that may be included in memory pressure metrics results display (as described elsewhere herein) may vary in form and amount in accordance with different embodiments. For example, in one embodiment, memory allocation for all objects may be tracked by default which are referenced in a program. An embodiment may also provide for selection of one or more objects, or one or more classes of objects, for which memory pressure computations are performed. Additionally, there may be variations in connection with which objects are tracked based on what code allocates or creates the object. For example, a user may explicitly create an object and perform other explicit commands within their code for object management and use. It may be desirable from a user's perspective or a programmer's perspective to only track memory allocation for those objects for which the user has control over management thereof. Objects may also be allocated when a user makes a call to third party software. In particular, it may be desirable to have an option to not track such objects created by third party software since a user may have no control over the management of such objects.

The particular objects that are tracked for purposes of the memory pressure metric may be defined, for example, through an inclusion list or a defined tracked object list. For example, objects may be tracked as associated with a specific variable or object name space such as a user name space.

In connection with a user program, a programmer may want to know different aspects of object usage within the program such as, for example, a measurement of memory efficiency as determined by metrics and before and after corrections as described elsewhere herein. Additionally, a programmer may want to know if there are objects which have not been disposed of via garbage collection at all, which objects may be disposed of earlier in connection with program execution, and the like. The foregoing, for example, may be used in connection with providing this and other information to a programmer to facilitate more efficient object use within a program. It is possible to report to the user regarding disposable objects that were not disposed of. It is possible to report on objects instantiated too early in accordance with a pre-defined threshold. This may be determined, for example, in accordance with D2 values for one or more objects where the D2 value exceeds the threshold. It is also possible to report on one or more objects having the highest memory ratios 1 and 2. These objects having the highest memory ratios may be characterized as objects that have remained in memory for a relatively long time in comparison with their useful lifetime. As also described herein, classes with the longest average retention duration may be determined. Classes whose instances on average have long retention durations may assist a programmer in focusing upon one or more individual classes that may be associated with object retention problems.

As described herein, for each object that is tracked, a line of user code information may be determined with one or more different metrics. For example, a line of user code may be recorded when an object is first allocated, first used, last used and deallocated. Such information regarding lines of code may be reported to the user as a hint regarding where a code correction may be warranted. For example, the line of code of where an object was first created and first referenced may be utilized to adjust the point at which an object is created if there is an unneeded gap therebetween. The line of code as to a last use of an object may be used to determine when an object may be available for garbage collection. In addition to the line of user code, an embodiment may also include other source code information such as, for example, source module name, runtime stack information, and the like.

For each object tracked, additional information may also be gathered. For example, an embodiment may include an indicator as to whether the object allocation and/or usage is in user code or other code, such as system code or other third party code.

The measurements T1-T4 may be obtained using any one or more different techniques known to those of ordinary skill in the art. In some instances, one or more callback routines may be invoked at desired points during program execution to gather data. For example, it is possible to use an interface to define a callback routine to be invoked when an object is created or allocated. When a method or routine for object allocation is invoked, the defined callback routine may be invoked. The callback routine may be invoked prior to (prolog) and/or at the end of (epilog) execution of code for object allocation. Similarly, other callback routines may be defined and invoked during program execution. In one embodiment, callback routines may be defined to perform the following operations in connection with an object:

Object creation/allocation:
　If object is to be tracked then record T1.

Method Enter/Exit:
　If object is tracked and T2 not set, then set T2.
　If object is tracked then set T3.

Garbage Collection:
　If object is tracked, then set T4.

It is also possible to use an instrumented version of a program so that selected calls, such as for object creation/allocation, method entry/exit, and the like, are intercepted and control is passed to a wrapper or stub function. The wrapper or stub function may collect data, such as times T1-T4 and other data (e.g., source code information), prior to executing code of the intercepted routine. Techniques for instrumenting code are known to those of ordinary skill in the art. In some instances, it is also possible to track when a dispose routine is called, or when any other particular routine is called. Environments suitable for use of the system described herein include web hosts, .NET or JAVA framework environments, and databases.

In one embodiment, the .NET framework environment has a mechanism to get callback information on the above-noted events of interest. To calculate the memory pressure metric, every time there is a memory allocation and time has changed, the following is computed:

timeElaspsed=timeStampAtAlloc−previousAllocTimeStamp currentAllocationPressure=memoryAllocated×timeElapsed totalMemoryPressure=totalMemoryPressure+currentAllocationPressure The above method avoids performing the memory pressure computation every time there is a method enter (that is every time x is incremented by 1) which may provide for improved efficiency of the system. Alternatively, it is contemplated herein that, for other reasons, the memory pressure metric may be calculated every time there is a method enter, or in combination with the incremental method described above.

In another embodiment, the memory pressure metric may be calculated by adding to the metric when memory is allocated and subtracting from the metric when memory is deallocated.

Figure 4:
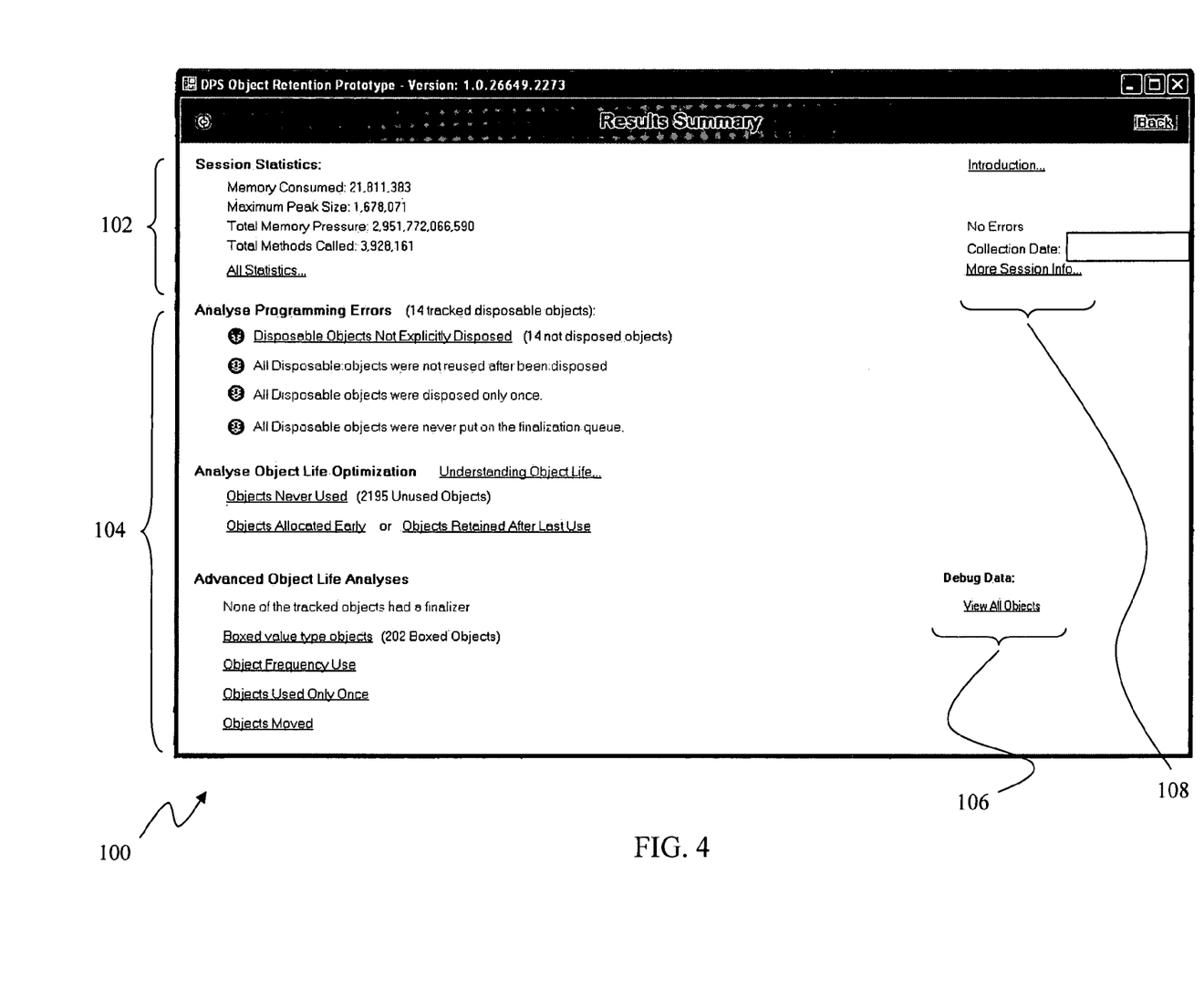
FIG. 4 is a graphical interface illustrating presentation of the memory pressure metrics according to an embodiment of the system described herein.

FIG. 4 is a graphical interface display 100 illustrating presentation of the memory pressure metrics described herein. The graphical interface display 100 may be displayed as part of a user interface in connection with execution of software under test. Some time after a user starts a session, the graphical interface display 100 may be displayed to a user to show the results of metric analysis and computation. Data, such as T1-T4 measurements, memory allocation information, source code information, and the like, may be collected during execution of the program. Metrics may be calculated and output to a file and/or memory, for example, when the program terminates and/or also in response to a user selection. Subsequently, the data included in the file and/or memory may be displayed to the user in any one of a number of appropriate formats. A portion 102 of the graphical interface display 100 illustrates summary statistical information of the software according to the system described herein. The information includes data on memory consumed, maximum peak size, total memory pressure results of the session using the techniques described herein, and the number of method calls of the software (as a time unit).

The graphical interface display 100 may further display or provide links to information 104 that allows a software programmer to analyze errors of the software under test and assess specific information on object usage. Other information 106 may be used to facilitate debugging of the software under test. The use of the information 104, 106 is further described elsewhere herein. Finally, administrative session information 108, such as collection date, may be displayed.

Although the memory pressure information of the graphic display 100 may provide useful data when considered by itself, it is anticipated that beneficial information results from a comparison of memory pressure data from before and after implementation of software changes. Such comparison information may help a software engineering understand the effects on dynamic memory resulting from changes to software code and facilitate application scalability analyses of the software changes.

Figure 5:
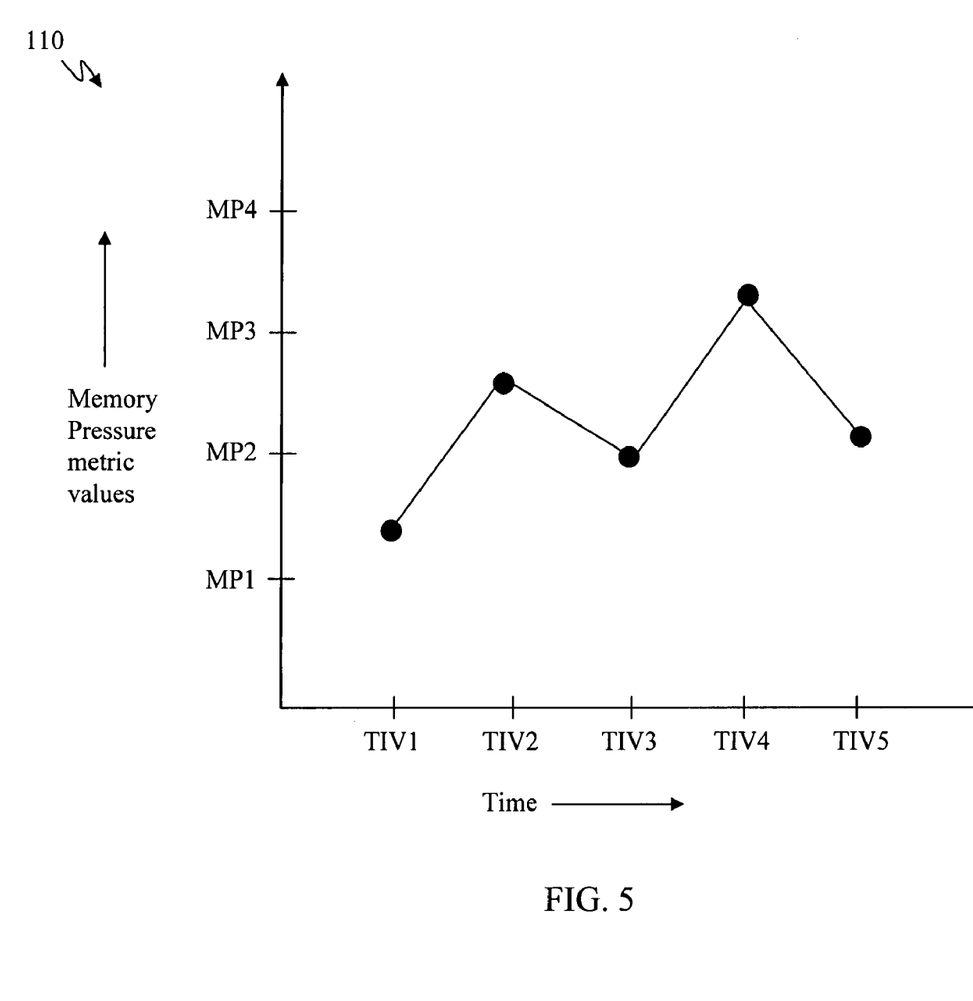
FIG. 5 is a line graph illustrating tracking of a memory pressure metric over time according to an embodiment of the system described herein.

FIG. 5 is a line graph 110 illustrating measurement of the memory pressure metric over a period of time according to an embodiment of the system described herein. The x-axis measures the value of the memory pressure metric and the y-axis measures time. As noted above, the time unit may be based on actual (wall clock) time or may be based on method calls of the software. That is, the time increment values (TIV) shown on the x-axis in the line graph (TIV1, TIV2, TIV3, TIV4, TIV5) may reflect time increments based on actual time (for example, daily) or some other metric. The y-axis is measured in memory pressure metric values (MP1, MP2, MP3, MP4) that are suitable for and consistent with the described system. Analysis of the line graph 110 may be useful in determining overall increase or decrease of memory consumption of a software program or fluctuations of memory consumption over time.

Figure 6:
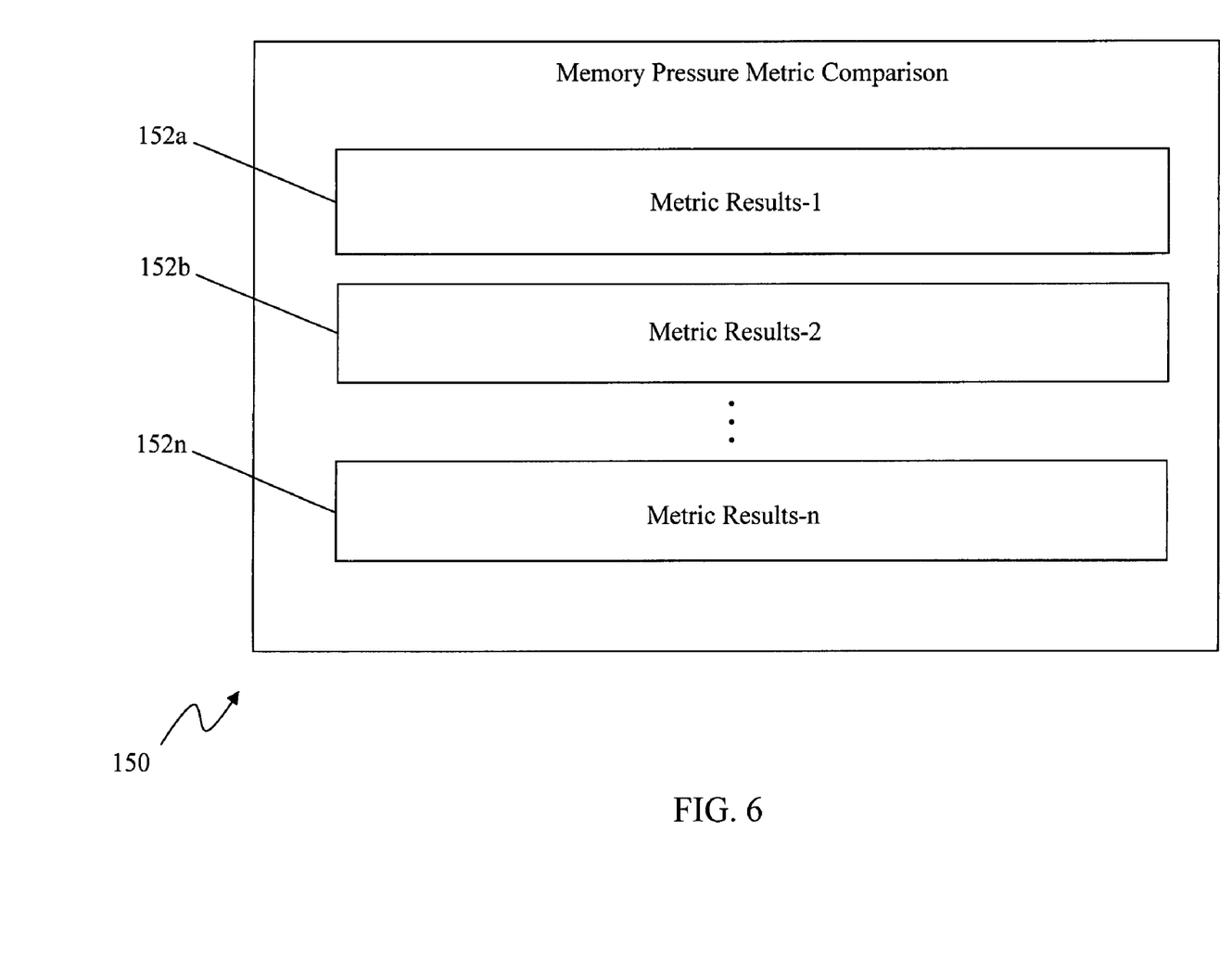
FIG. 6 is a tabular display of memory pressure metric comparison according to an embodiment of the system described herein.

FIG. 6 is a tabular display 150 of memory pressure metric comparison according to an embodiment of the system described herein. The tabular display 150 shows a display of multiple memory pressure metric analysis results 152a, 152b . . . 152n, for example for comparisons of software programs, i.e. multiple versions of a software program, or of multiple changes to the operation of a software program, i.e. a same software program operating under different configurations. Based on a comparison of the memory pressure metric results, a software programmer may assess which program version or configuration uses a desirable memory allocation schema.

Figure 7:
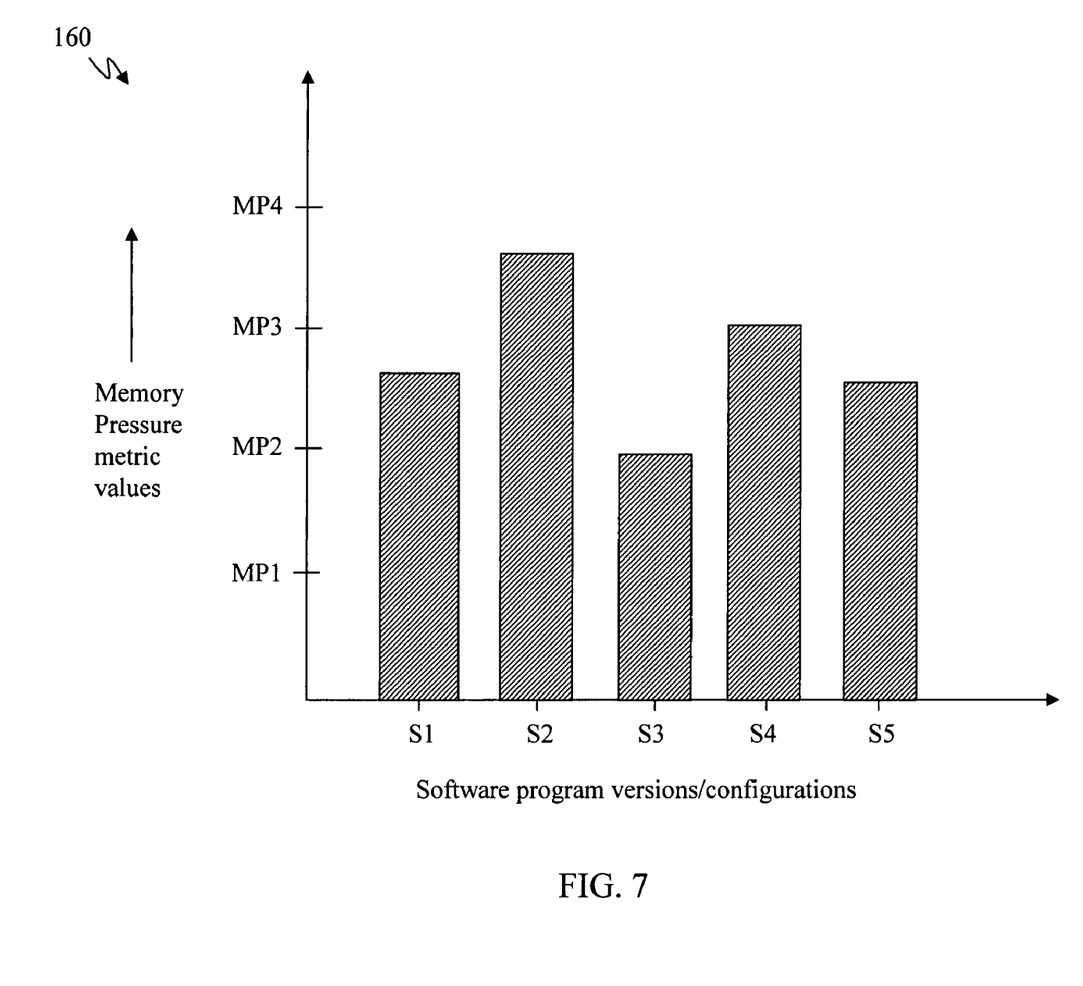
FIG. 7 is a bar graph illustrating comparison of memory pressure metric values for various software program versions/configurations according to an embodiment of the system described herein.

FIG. 7 is a bar graph 160 illustrating a comparison of memory pressure metrics for five software program versions or software operating under different configurations (S1-S5) according to an embodiment of the system described herein. As shown, the comparison indicates that S2 has the highest memory pressure metric whereas S3 has the lowest. Consequently, the results may indicate that the version/configuration for S3 is more desirable from a memory consumption standpoint.

Figure 8A:
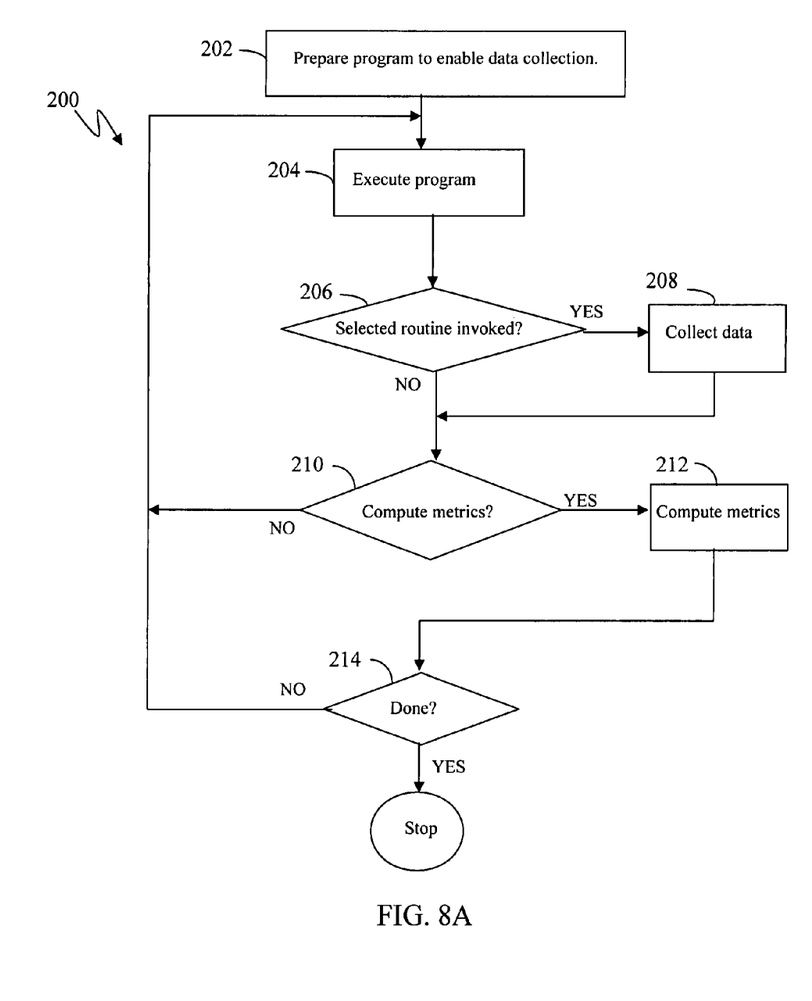
FIG. 8A is a flowchart that illustrates processing steps for an overall process for data collection and metric computation according to an embodiment of the system described herein.

Referring to FIG. 8A, a flowchart 200 illustrates processing steps that may be performed in connection with computing the metrics described herein. The steps of the flowchart 200 correspond to processes described elsewhere herein. Processing begins at a step 202, where the program being monitored is prepared to enable the collection of the data, such as measurements T1-T4 as described herein. The step 202 may include, for example, defining the necessary callbacks, instrumenting the program, or portions thereof, and the like. The processing performed in the step 202 may vary according to specific implementation of the system described herein as well as the nature of the program being monitored. Following the step 202 is a step 204 where the program being monitored is executed. Following the step 204 is a step 206 where a determination is made as to whether a selected routine has been invoked for which data is to be gathered (e.g., an object create routine or invocation of an already-created object). If a selected routine has been invoked, then control passes to a step 208 to collect the data. As described elsewhere herein, a callback routine or intercepted call in connection with instrumented code may result in invocation of code which performs the data collection at the step 208.

If it is determined at the step 206 that a selected routine has not been invoked, and no data is to be collected for the currently executed routine, then control proceeds to a step 210. Note that the step 210 is also reached following the step 208. At the step 210, a determination is made as to whether the metrics are to be computed for the collected data. In some instances, metrics may be computed at one or more points during program execution, including possibly at the end of execution. In other instances, the metrics may be computed only at the end of program execution. In some embodiments, a user may be able to select, via an appropriate user interface, when to compute and/or display the metrics.

If it is determined at the step 210 that the metrics are not to be computed, then control passes from the step 210 back to the step 204, described above. Otherwise, control passes from the step 210 to a step 212 to compute the metrics using, for example, formulas described elsewhere herein. Following the step 212 is a step 214, where it is determined whether program execution is complete. If so, program execution stops. Otherwise, control passes from the step 214 back to the step 204, described above, to continue with program execution.

It is possible to perform other processing in connection with gathering other data, for example, if the techniques described herein are used to analyze a program along with other program analysis features. Note also that the processing illustrated by the flow chart 200 may represent invocation of mechanisms described elsewhere herein including stubs, callback routines, etc. so that, for example, the test at the step 206 may correspond to invocation of a callback routine rather than an actual test that is performed.

Figure 8B:
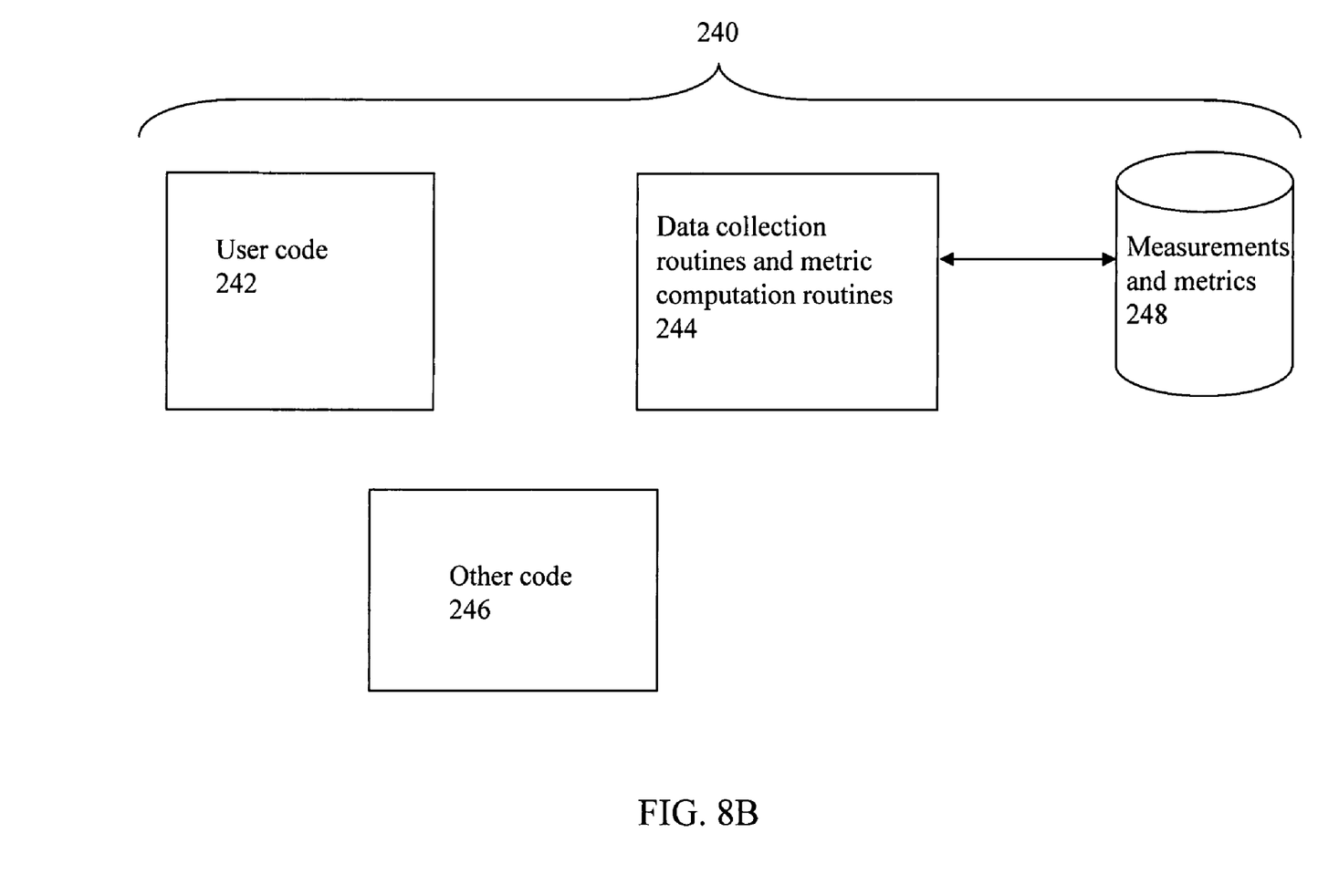
FIG. 8B illustrates components that may be included in connection with the techniques described herein for memory pressure metrics according to an embodiment of the system described herein.

Referring to FIG. 8B, components 240 that may be used in connection with the memory pressure techniques described herein include user code 242, a data recording component 244, libraries/third party code 246, and collected/calculated data 248. Data such as the measurements T1-T4, memory allocation information, and source code information may be recorded using code included in the user code 244 where the particular operation and invocation thereof may vary as described elsewhere herein. For example, the user code 244 may include callback routines which gather data, or other stub or wrapper functions to which control is transferred for an intercepted call, such as a routine for which information is gathered (e.g., method entry/exit, object allocation/creation, and the like).

The libraries/third part code 246 may be part of the executable program, but may or may not include the mechanisms described herein for gathering measurement data, such as T1-T4. The collected/calculated data 248 may include the measurements collected and any computed metrics as described herein. It should be noted that the measurements and computed metrics may be stored separately each in memory, on a storage device and the like and/or may be stored in separate memories or may be stored selectively (e.g., storing only T1-T4 and calculating the remaining metrics as needed).

Figure 9:
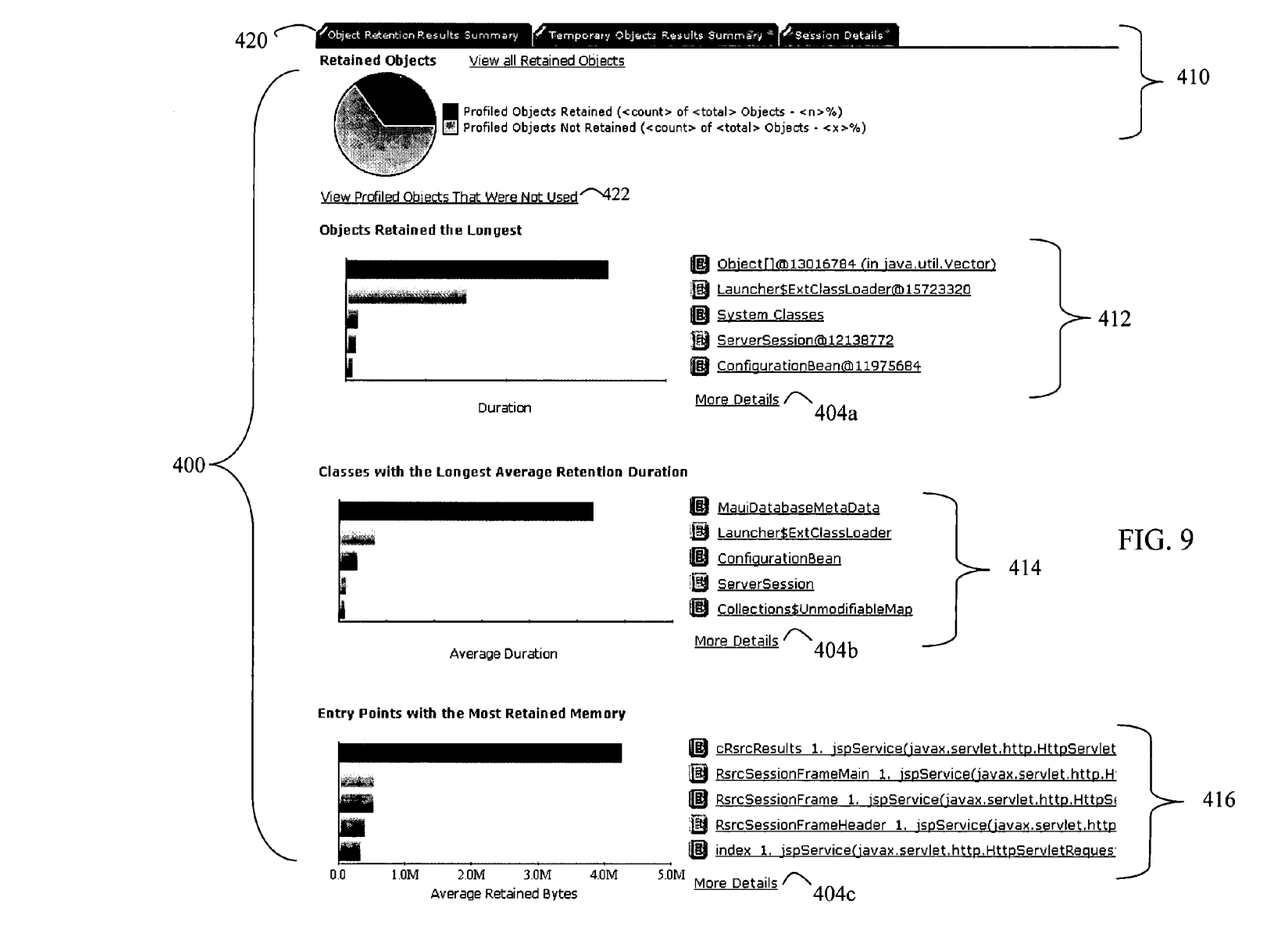
FIG. 9 is a graphical display illustrating presentation of object retention information in view of memory pressure metric analysis according to an embodiment of the system described herein.

Referring to FIG. 9, graphic display 400 illustrates presentation of object retention information in view of memory pressure metric analysis described herein. For example, a retained object may be characterized as an object having a D3 value exceeding a threshold. The threshold may be fixed, user modifiable, etc. The threshold may be in any one of a variety of different units, such as garbage collection cycles, as described elsewhere herein. An object may be classified as a retained object if, after the object is last used, the object is not garbage collected after a number of garbage collection cycles (or after a number of other units that may be used). The information on retained objects may be utilized by the software programmer to identify specifics of the software under test that were affected by software changes and to understand the cause and effect that software modifications have on the total memory pressure metric computations.

A section 410 may provide a graphical overview of retained objects for an entire program. If the retained object count is zero, then it may be determined that there are no memory leaks in the program. In some embodiments, an element 422 may be provided as a hyperlink to a list of object instances. In some cases, the element 422 may be displayed only if there are profiled instances having no first usage or no T2 time. Another element 412 may include a graphical display of objects which have the longest retention time. Code corrections related to objects having the longest retention times may provide the user with the greatest object memory management improvements. Another element 414 may include a graphical display of object classes on average having the longest retention durations. By identifying classes with problems, the user may focus on improvements to a particular class of objects. Another element 416 may include a graphical display of user entry code points that, on average, retain the largest amount of memory. The element 416 illustrates a scalability issue regarding object retention and memory usage. If an entry point retains a lot of memory longer than needed each time the entry point is invoked, there may be a point at which remaining available memory may be exhausted by calling that particular entry point.

Figure 10:
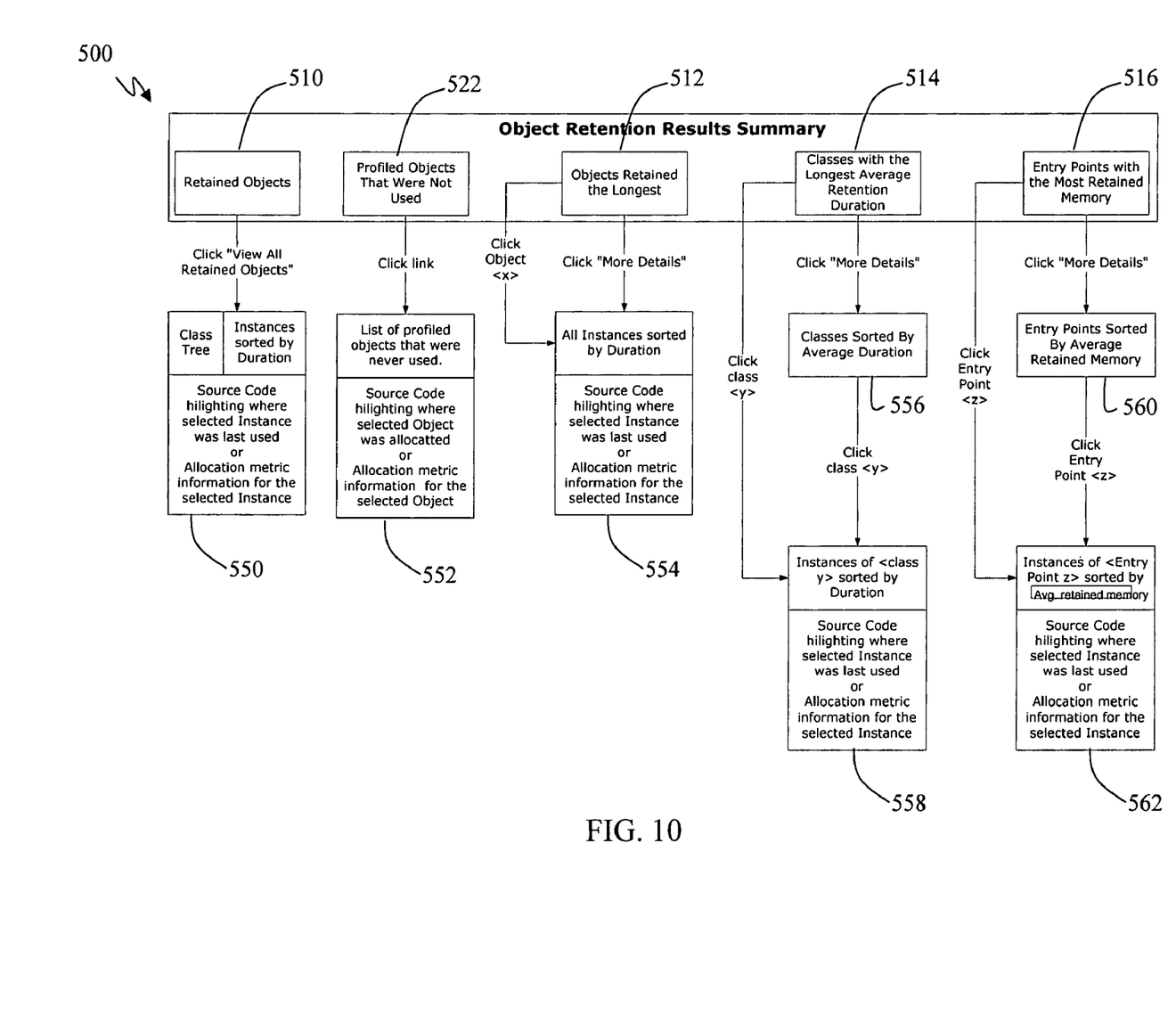
FIG. 10 is an example of data flow paths that may be taken via user interface selections to display program information about objects according to an embodiment of the system described herein.

Referring to FIG. 10, a diagram 500 illustrates data flow paths that may be taken in connection with selection of options and further display of information for the graphic display 400. Each of a plurality of elements 510, 522, 512, 514, 516 defines a flow path that may be taken by a user through other menu selections and options as part of allowing a user to drill down into source code to determine lines of source code to possibly correct. Each of the elements 510, 522, 512, 514, 516 corresponds to at least one of the elements 410, 412, 414, 416 included in graphic display 400 of FIG. 9.

The element 510 may be associated with the element 410 of FIG. 9, where selection of the "view all retained objects" 402 of FIG. 9 results in display of information about all retained objects, as illustrated by a box 550. A particular instance may then be selected and source code information regarding when the selected instance is last used and information concerning the memory allocation metric may be displayed. The element 522 may be associated with the element 422 of FIG. 9, where selection of the hyperlink 422 of FIG. 9 results in display of a list of profiled object that have never been used 552. Further selection of a particular object may result in source code information displayed for the allocation of the selected object.

The element 512 may be associated with the element 412 of FIG. 9, where selection of the "more details" option 404*a* of FIG. 9 may result in display of all instances sorted by duration, as illustrated by a box 554. A user may then select a particular object instance about which source code information regarding last use is displayed. The element 514 may be associated with the element 414 of FIG. 9, where selection of the "more details" option 404*b* of FIG. 9 may result in display of all classes sorted by duration, as illustrated by a box 558. Selection of a particular class may result in display of additional information about objects within the class. The element 516 may be associated with the element 416 of FIG. 9, where selection of the "more details" option 404*c* of FIG. 9 results in display of entry points sorted by average retained memory, as illustrated by the box 560. Selection of a particular entry may result in display of source code information as to where the selected instance was last used 562.

The foregoing describes memory analysis techniques and metrics that may be used to automate the process of obtaining memory usage information. In some embodiments, the foregoing may be performed without requiring interactive operations to output different snapshots of memory usage at different points in time during execution. A program may execute and, upon completion of execution, information regarding objects and associated memory usage may be output. A program may be easily and repeatedly executed at different points in time using the techniques described herein.

Note that different features of the system described herein, including features described in any applications incorporated by reference herein, may be combined in any appropriate fashion to provide a system with multiple features.

Other embodiments of the invention will be apparent to those skilled in the art from a consideration of the specification or practice of the system disclosed herein. It is intended that the specification and examples be considered as exemplary only, with the true scope and spirit of the invention being indicated by the following claims.

What is claimed is:

1. A method of measuring memory allocation information, comprising:
   determining a time when a resource is allocated;
   determining a size of said resource;
   determining a time measurement, measured after the time when the resource is allocated, that is based on usage of said resource;
   determining a metric for memory allocation based on said size of said resource and said time measurement.

2. The method according to claim 1, further comprising:
   determining an elapsed time since a previous resource was allocated;
   determining a total of all memory allocated by adding the size of said resource to sizes of resources previously allocated;
   determining a current memory pressure by multiplying the elapsed time by the total of all memory allocated; and
   determining the metric for memory allocation by summing the current memory pressure with a value calculated for the metric in connection with a previous iteration.

3. The method according to claim 1, wherein determining the metric for memory allocation includes integrating a memory allocation function over time.

4. The method according to claim 1, wherein determining the metric for memory allocation includes adding to the metric when memory is allocated and subtracting from the metric when memory is deallocated.

5. The method according to claim 1, wherein the resource is a software object.

6. The method according to claim 1, wherein the time measurement corresponds to at least one of: a number of method calls since the beginning of program execution, a number of method calls from a first point to a second point, and actual time.

7. The method according to claim 1, further comprising:
   displaying said metric.

8. The method, according to claim 1, further comprising:
   determining a first metric;
   determining a second metric;
   displaying a comparison of said first metric and said second metric.

9. The method according to claim 8, wherein said first metric and said second metric are determined for at least one of: (i) a first software program and a second software program and (ii) a software program operating under a first condition and a second condition.

10. A computer-readable storage medium storing computer software that measures memory allocation information, the computer software stored on the computer-readable storage medium comprising:
executable code that determines a time when a resource is allocated;
executable code that determines a size of said resource;
executable code that determines a time measurement, measured after the time when the resource is allocated, that is based on usage of said resource;
executable code that determines a metric for memory allocation based on said size of said resource and said time measurement.

11. The computer-readable storage medium, according to claim 10, further comprising:
executable code that determines an elapsed time since a previous resource was allocated;
executable code that determines a total of all memory allocated by adding the size of said resource to sizes of resources previously allocated;
executable code that determines a current memory pressure by multiplying the elapsed time by the total of all memory allocated; and
executable code that determines the metric for memory allocation by summing the current memory pressure with a value calculated for the metric in connection with a previous iteration.

12. The computer-readable storage medium according to claim 10, wherein determining the metric for memory allocation includes integrating a memory allocation function over time.

13. The computer-readable storage medium according to claim 10, wherein determining the metric for memory allocation includes adding to the metric when memory is allocated and subtracting from the metric when memory is deallocated.

14. The computer-readable storage medium according to claim 10, wherein the resource is a software object.

15. The computer-readable storage medium according to claim 10, wherein time measurement corresponds to at least one of: a number of method calls since the beginning of program execution, a number of method calls from a first point to a second point, and actual time.

16. The computer-readable storage medium according to claim 10, further comprising:
executable code for displaying said metric.

17. The computer-readable storage medium according to claim 10, further comprising:
executable code for determining a first metric;
executable code for determining a second metric;
executable code for displaying a comparison of said first metric and said second metric.

18. The computer-readable storage medium according to claim 10, wherein said first metric and said second metric are determined for at least one of: (i) a first software program and a second software program and (ii) a software program operating under a first condition and a second condition.

19. A system for assessing memory allocation information, comprising:
a processor that contains machine executable code that that determines a time when a resource is allocated, machine executable code that determines a size of said resource, machine executable code that determines a time measurement, measured after the time when the resource is allocated, that is based on usage of said resource; and machine executable code that determines the metric for memory allocation by summing the current memory pressure with a value calculated for the metric in connection with a previous iteration; and
an interface that displays information about said metric.

20. The system according to claim 19, wherein the processor further includes machine executable code that determines an elapsed time since a previous resource was allocated, machine executable code that determines a total of all memory allocated by adding the size of said resource to sizes of resources previously allocated, machine executable code that determines a current memory pressure by multiplying the elapsed time by the total of all memory allocated, and machine executable code that determines the metric for memory allocation by summing the current memory pressure with a value calculated for the metric in connection with a previous iteration.

21. The system according to claim 19, wherein determining the metric for memory allocation includes integrating a memory allocation function over time.

22. The system according to claim 19, wherein determining the metric for memory allocation includes adding to the metric when memory is allocated and subtracting from the metric when memory is deallocated.

23. The system according to claim 19, wherein the resource is a software object.

24. The system according to claim 19, wherein time measurement corresponds to at least one of: a number of method calls since the beginning of program execution, a number of method calls from a first point to a second point, and actual time.

25. The system according to claim 19, wherein said processor further comprises machine executable code for determining a first metric and machine executable code for determining a second metric, and wherein said interface displays a comparison of said first metric and said second metric.

26. The system according to claim 19, wherein said first metric and said second metric are determined for at least one of: (i) a first software program and a second software program and (ii) a software program operating under a first condition and a second condition.

* * * * *